(12) United States Patent
Kwon et al.

(10) Patent No.: US 9,618,402 B2
(45) Date of Patent: Apr. 11, 2017

(54) THERMAL INSULATION PERFORMANCE MEASUREMENT APPARATUS AND MEASUREMENT METHOD USING THE SAME

(71) Applicant: Samsung Electronics Co., Ltd., Suwon-si (KR)

(72) Inventors: Jae Sung Kwon, Seoul (KR); Hyung Sung Kim, Yongin-si (KR); Jong Sung Park, Seoul (KR); Young Sung Jung, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 513 days.

(21) Appl. No.: 14/058,603

(22) Filed: Oct. 21, 2013

(65) Prior Publication Data
US 2014/0050246 A1    Feb. 20, 2014

Related U.S. Application Data

(63) Continuation of application No. 13/747,625, filed on Jan. 23, 2013, now Pat. No. 8,882,344.

(30) Foreign Application Priority Data

Feb. 1, 2012 (KR) .................... 10-2012-0010458
Jun. 1, 2012 (KR) .................... 10-2012-0059278

(51) Int. Cl.
*G01K 17/00* (2006.01)
*F25D 23/06* (2006.01)
*G01K 17/20* (2006.01)

(52) U.S. Cl.
CPC ............ *G01K 17/00* (2013.01); *F25D 23/065* (2013.01); *G01K 17/20* (2013.01)

(58) Field of Classification Search
CPC ...................................................... F25D 23/065
(Continued)

(56) References Cited

U.S. PATENT DOCUMENTS

| 4,117,712 A | 10/1978 | Hager, Jr. |
| 4,630,938 A | 12/1986 | Piórkowska-Palczewska et al. |

(Continued)

FOREIGN PATENT DOCUMENTS

| CN | 1513104 | 7/2004 |
| CN | 101126729 | 2/2008 |

(Continued)

OTHER PUBLICATIONS

US Office Action issued Nov. 22, 2013 in copending U.S. Appl. No. 13/747,625.

(Continued)

*Primary Examiner* — Lisa Caputo
*Assistant Examiner* — Jamel Williams
(74) *Attorney, Agent, or Firm* — Staas & Halsey LLP

(57) ABSTRACT

A thermal insulation performance measurement apparatus which measures thermal insulation performance of a thermal insulator by heat flux to the thermal insulator, measured by a heat flux sensor, and a measurement method using the same includes a heat flux sensor provided with one surface adapted to contact an object to be measured, a first heat source arranged on the upper surface of the heat flux sensor to supply heat to the heat flux sensor, a thermal insulator arranged on the upper surface of the first heat source, a third heat source arranged on the upper surface of the thermal insulator, and a second heat source arranged around the heat flux sensor.

23 Claims, 12 Drawing Sheets

(58) Field of Classification Search
USPC .................................................. 374/4, 5, 29
See application file for complete search history.

(56) References Cited

U.S. PATENT DOCUMENTS

| | | | | |
|---|---|---|---|---|
| 6,039,471 | A * | 3/2000 | Wyland | G01K 7/01 374/43 |
| 6,257,761 | B1 * | 7/2001 | Chuah | G01N 25/18 374/137 |
| 6,991,366 | B2 | 1/2006 | Naka et al. | |
| 7,197,888 | B2 * | 4/2007 | LeClear | A47B 71/00 62/186 |
| 7,318,671 | B1 * | 1/2008 | Moghaddam | G01N 25/18 374/30 |
| 7,540,656 | B1 * | 6/2009 | Stochl | G01N 25/18 374/29 |
| 7,748,197 | B2 * | 7/2010 | Romes | G01K 17/08 374/135 |
| 8,801,282 | B2 * | 8/2014 | Bieberich | G01K 13/002 374/1 |
| 2002/0114937 | A1 * | 8/2002 | Albert | C04B 38/0022 428/304.4 |
| 2004/0174106 | A1 * | 9/2004 | Uekado | F25D 23/062 312/401 |
| 2014/0286373 | A1 * | 9/2014 | Thresher | G01N 25/18 374/29 |
| 2015/0092812 | A1 * | 4/2015 | Jun | H01L 35/00 374/44 |
| 2016/0007894 | A1 * | 1/2016 | Kahlman | A61B 5/6833 600/323 |

FOREIGN PATENT DOCUMENTS

| | | |
|---|---|---|
| CN | 101871901 | 10/2010 |
| CN | 101936933 | 1/2011 |
| DE | 2724846 | 12/1978 |
| JP | 62-225822 | 10/1987 |
| JP | 10-206360 | 8/1998 |
| JP | 2006-078185 | 3/2006 |
| JP | 2006-78185 | 3/2006 |
| JP | 2006078185 A * | 3/2006 |
| JP | 2006-118559 | 5/2006 |
| JP | 2006-125527 | 5/2006 |
| JP | 2008-286720 | 11/2008 |
| JP | 2009-281910 | 12/2009 |
| JP | 2010-143602 | 7/2010 |
| KR | 20-0122672 | 7/1998 |
| KR | 10-2011-0051792 | 5/2011 |

OTHER PUBLICATIONS

Korean Office Action issued Nov. 19, 2014 in Korean Patent Application No. 10-2012-0059278.
Korean Office Action dated Nov. 10, 2015 in Korean Patent Application 10-2013-0095273.
US Notice of Allowance issued Jul. 8, 2014 in U.S. Appl. No. 13/747,625.
International Search Report mailed May 15, 2013 in corresponding International Patent Application No. PCT/KR2013/000825.
U.S. Appl. No. 13/747,625, filed Jan. 23, 2013, Jae Sung Kwon et al., Samsung Electronics Co., Ltd.
Korean Notice of Allowance dated Feb. 24, 2016 in Korean Patent Application No. 10-2013-0095273.
Chinese Office Action dated Apr. 12, 2016 in Chinese Patent Application No. 201310041959.5.
Extended European Search Report dated Sep. 20, 2016 in European Patent Application No. 16175836.2.
Extended European Search Report dated Jul. 12, 2016 in European Patent Application No. 13153720.1.
Chinese Office Action dated Dec. 30, 2016 in Chinese Patent Application No. 201310041959.5.

* cited by examiner

THERMAL INSULATION PERFORMANCE MEASUREMENT APPARATUS AND MEASUREMENT METHOD USING THE SAME

CROSS-REFERENCE TO RELATED APPLICATIONS

This application is a continuation of U.S. patent application Ser. No. 13/747,625 filed Jan. 23, 2013 in the United States Patent and Trademark Office, and claims the priority benefit of Korean Patent Application No. 10-2012-0010458, filed on Feb. 1, 2012 and Korean Patent Application No. 10-2012-0059278, filed on Jun. 1, 2012, in the Korean Intellectual Property Office, the disclosures of which are incorporated herein by reference.

BACKGROUND

1. Field

The following description relates to a measurement apparatus for measuring thermal insulation performance of a thermal insulator through variation of heat flux measured by a heat flux sensor, and a measurement method using the same.

2. Description of the Related Art

In general, a vacuum insulation panel has excellent thermal insulation performance when compared with existing thermal insulators, and is thus applied to various fields, such as buildings, home appliances, etc. Such a vacuum insulation panel includes a porous inner core member maintaining the shape of the thermal insulator, an outer surface film having gas barrier properties and surrounding the inner core member to maintain a vacuum, and a gas desiccant to maintain the vacuum for a long time. The thermal insulation performance of the vacuum insulation panel is determined according to the degree of vacuum of the inside of the vacuum insulation panel, and when pressure of the inside of the vacuum insulation panel reaches a designated level or more, the thermal insulation performance of the vacuum insulation panel is rapidly lowered. A getter or the desiccant within the vacuum insulation panel suppresses such degradation of the thermal insulation performance caused by increase of the inner pressure of the vacuum insulation panel, and thus the vacuum insulation panel maintains high thermal insulation performance for a long time. There are various factors causing the degradation of the thermal insulation performance of the vacuum insulation panel, and among these factors, the main factor is penetration of gas due to damage to the outer surface film by external impact when the vacuum insulation panel is handled and transported. The outer surface film includes a metal thin film formed of aluminum foil having a thickness of 6-7 μm to prevent gas penetration, an external plastic film to protect the metal thin film, and a low density polyethylene (LDPE) layer serving as a heat fusion layer for manufacturing a pouch. When the outer surface film is torn, gas is instantaneously introduced into the vacuum insulation panel, the vacuum insulation panel is expanded, and thus gas penetration into the vacuum insulation panel is recognized with the naked eye, but if a slow leak occurs, gas penetration is slowly carried out and thus it may be difficult to recognize such gas penetration with the naked eye due to influence of adsorption of the getter or the desiccant.

However, after the vacuum insulation panel has been embedded in a refrigerator or the wall of a building, it may be difficult to replace the vacuum insulation panel with a new one. Particularly, in case of a refrigerator, when a defect of the vacuum insulation panel is detected after the vacuum insulation panel has been embedded in the refrigerator, the entirety of the refrigerator product is discarded. Therefore, necessity of executing a reliability test to check the inner pressure or thermal conductivity of the vacuum insulation panel before mounting of the vacuum insulation panel rises.

SUMMARY

Therefore, it is an aspect of the present disclosure to provide a thermal insulation performance measurement apparatus which rapidly and accurately tests thermal insulation performance of a thermal insulator, and a measurement method using the same.

It is an aspect of the present disclosure to provide a thermal insulation performance measurement apparatus which measures thermal insulation performance of a thermal insulator when the thermal insulator is installed within a product, and a measurement method using the same.

Additional aspects of the invention will be set forth in part in the description which follows and, in part, will be obvious from the description, or may be learned by practice of the invention.

In accordance with an aspect of the present disclosure, a thermal insulation performance measurement apparatus includes a heat flux sensor provided with one surface adapted to contact an object to be measured, a first heat source arranged on the upper surface of the heat flux sensor to supply heat to the heat flux sensor, a second heat source arranged around the heat flux sensor to prevent generation of heat flow around the heat flux sensor, and a thermal insulator arranged on the upper surface of the first heat source.

The thermal insulation performance measurement apparatus may further include a third heat source arranged on the upper surface of the thermal insulator to prevent generation of heat flow above the heat flux sensor.

The thermal insulation performance measurement apparatus may further include a controller to adjust temperatures of the first heat source, the second heat source, and the third heat source.

The controller may control the temperatures of the first heat source, the second heat source, and the third heat source so that the temperatures of the first heat source, the second heat source, and the third heat source are equal.

The heat flux sensor may be a contact-type heat flux sensor.

The thermal insulator may be a vacuum insulation panel or a vacuum glass panel.

In accordance with an aspect of the present disclosure, an automatic measurement system includes a thermal insulation performance measurement apparatus including a heat flux sensor provided with one surface adapted to contact an object to be measured, a first heat source arranged on the upper surface of the heat flux sensor to supply heat to the heat flux sensor, a second heat source arranged around the heat flux sensor to prevent generation of heat flow around the heat flux sensor, and a thermal insulator arranged on the upper surface of the first heat source, a drive device moving the thermal insulation performance measurement apparatus forwards and backwards and bringing the thermal insulation performance measurement apparatus into contact with the object to be measured at a designated pressure, and a rod cell to measure pressure applied between the thermal insulation performance measurement apparatus and the object to be measured.

The drive device may include a motor to provide driving force, and a ball screw to convert a rotational motion generated from the motor into a linear motion.

The drive device may include an air cylinder.

In accordance with an aspect of the present disclosure, a thermal insulation performance measurement method includes heating a heat flux sensor to a designated temperature, heating a region around the heat flux sensor to the designated temperature to prevent generation of heat flow at the region around the heat flux sensor, heating a region above the heat flux sensor to the designated temperature to prevent generation of heat flow at the region above the heat flux sensor, and measuring thermal insulation performance of an object to be measured by first heat flux measured by the heat flux sensor through contact of the heat flux sensor heated to the designated temperature with the object to be measured.

The thermal insulation performance of the object to be measured may be measured by the first heat flux measured by the heat flux sensor after a designated time from contact of the heat flux sensor with the object to be measured has elapsed.

The measurement of the thermal insulation performance of the object to be measured may include measuring first thermal conductivities of plural samples using a thermal conductivity measurement apparatus, acquiring first data regarding the relationship between the first thermal conductivities and second heat fluxes by measuring the second heat fluxes of the samples using the heat flux sensor, and measuring the thermal insulation performance of the object to be measured by estimating thermal conductivity of the object to be measured using the second heat flux based on the first data.

The measurement of the thermal insulation performance of the object to be measured may include measuring first thermal conductivities of a vacuum insulation panel, the inner pressure of which is adjustable, using a thermal conductivity measurement apparatus while adjusting the inner pressure of the vacuum insulation panel, acquiring first data regarding a relationship between the first thermal conductivities and second heat fluxes by measuring the second heat fluxes of the vacuum insulation panel using the heat flux sensor, and measuring the thermal insulation performance of the vacuum insulation panel by estimating thermal conductivity of the vacuum insulation panel using the second heat flux based on the first data.

The measurement of the thermal insulation performance of the object to be measured may further include measuring third heat fluxes of the vacuum insulation panel, the inner pressure of which is adjustable, at respective degrees of the inner pressure of the vacuum insulation panel using the heat flux sensor while adjusting the inner pressure of the vacuum insulation panel to the respective degrees, and correcting the first data by comparing the third heat fluxes with third data regarding a relationship between the degree of the vacuum of the inside and the thermal conductivity of the vacuum insulation panel.

In accordance with an aspect of the present disclosure, a refrigerator includes an outer case forming the external appearance of the refrigerator, an inner case disposed at the inside of the outer case and forming storage chambers, and thermal insulation members embedded between the outer case and the inner case to block cold air in the storage chambers, wherein the thermal insulation members include first thermal insulation members formed of a vacuum insulation panel attached to the inner surface of the outer case, and second thermal insulation members formed by injecting urethane foam into a space between the outer case and the inner case, remaining after the first thermal insulation members are been arranged, and before the first thermal insulation members formed of the vacuum insulation panel are attached to the outer case, only first thermal insulation members formed of the vacuum insulation panel, designated thermal insulation performance of which has been secured using a thermal insulation performance measurement apparatus, are used to form the thermal insulation members, and thus disposal of a product due to a defect of the final thermal insulation members is prevented.

The thermal insulation performance measurement apparatus may include a heat flux sensor, a first heat source arranged on the upper surface of the heat flux sensor to supply heat to the heat flux sensor, and a second heat source arranged around the heat flux sensor to prevent movement of heat flow to a region around the heat flux sensor.

BRIEF DESCRIPTION OF THE DRAWINGS

These and/or other aspects of the invention will become apparent and more readily appreciated from the following description of the embodiments, taken in conjunction with the accompanying drawings of which.

DETAILED DESCRIPTION

Figure 1:
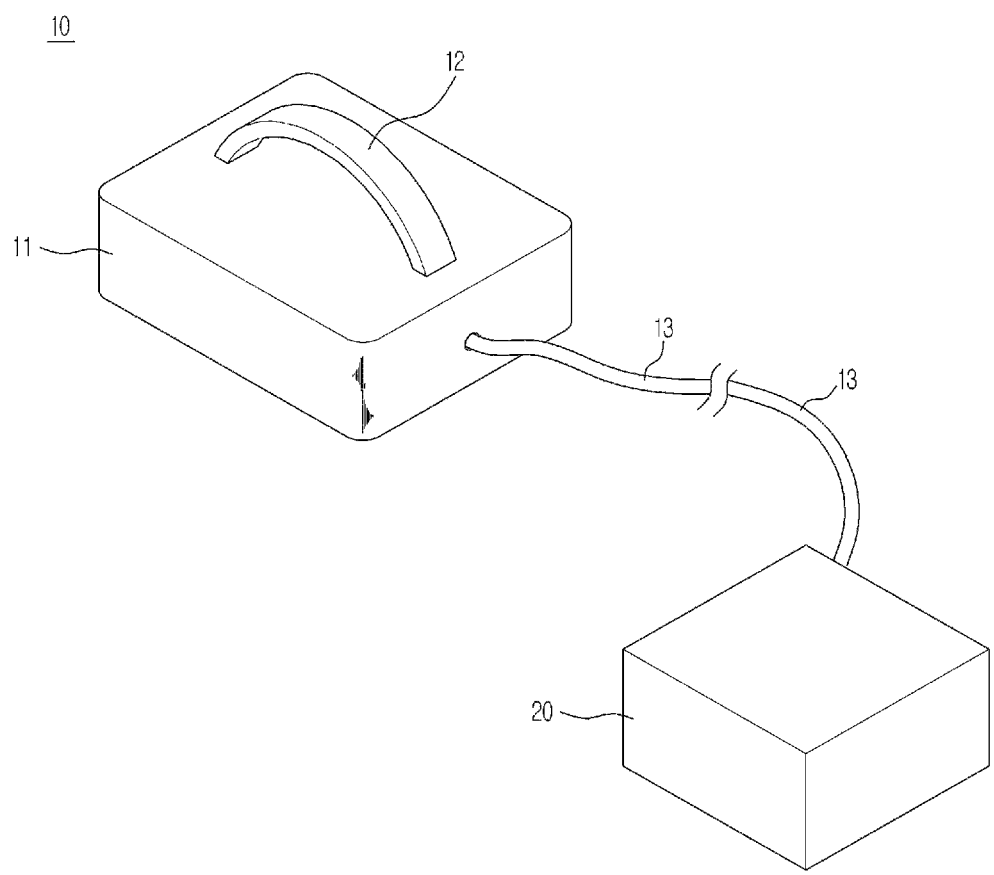
FIG. 1 is a perspective view of a thermal insulation performance measurement apparatus in accordance with an embodiment of the present disclosure.
Figure 2:
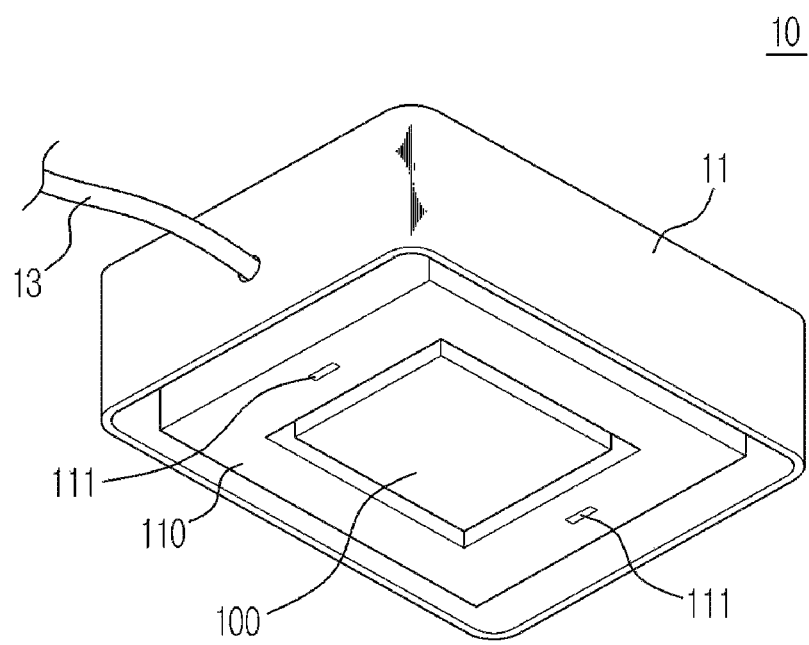
FIG. 2 is a view illustrating the lower portion of the thermal insulation performance measurement apparatus.

Reference will now be made in detail to the embodiments of the present disclosure, examples of which are illustrated in the accompanying drawings, wherein like reference numerals refer to like elements throughout. The embodiments are described below to explain the present disclosure by referring to the figures.

Hereinafter, a thermal insulation performance measurement apparatus in accordance with an embodiment of the present disclosure will be described with reference to the accompanying drawings.

As shown in FIGS. 1 to 4, a thermal insulation performance measurement apparatus 10 includes a cover 11 forming the external appearance of the thermal insulation performance measurement apparatus 10, and a handle 12 installed on the upper portion of the cover 11.

The cover 11 is configured such that the lower portion of the cover 11 opposite the upper surface of the cover 11 on which the handle 12 is installed is opened, and the thermal insulation performance measurement apparatus 10 may include a heat flux sensor 100, a first heat source 120, a second heat source 110, a thermal insulator 130, and a third heat source 140, which are installed within the cover 11.

The heat flux sensor 100 may be arranged at the center of the opened lower portion of the cover 11 to contact the surface of an object V to be measured. The heat flux sensor 100 may be a contact-type heat flux sensor 100, and in this case, the heat flux sensor 100 may include a film-type thin sheet.

In the heat flux sensor 100, a heat flux measurement direction is set. The heat flux sensor 100 may be arranged such that the heat flux measurement direction is toward the object V to be measured.

The first heat source 120 to heat the heat flux sensor 100 to a designated temperature is arranged on the upper surface of the heat flux sensor 100. The first heat source 120 may be configured in a shape in which an electric heater is inserted into a metal having excellent thermal conductivity, such as copper or aluminum, for example, or in a type in which a thin film heater is attached to a metal. Further, the first heat source 120 may be configured such that a fluid heated to a constant temperature is circulated, and may include a temperature sensor 121 to sense the temperature of the heat flux sensor 100 and the first heat source 120. The first heat source 120 may be provided with one surface having a size corresponding to the upper surface of the heat flux sensor 100 to cover the entirety of the upper surface of the heat flux sensor 100.

The second heat source 110 is arranged around the heat flux sensor 100 and the first heat source 120, and may have the same thickness as the sum of the thickness of the heat flux sensor 100 and the thickness of the first heat source 120. The second heat source 110 may be configured in a shape in which an electric heater is inserted into a metal or in a type in which a thin film heater is attached to a metal, in the same manner as the first heat source 120. Further, the second heat source 110 may be configured such that a fluid heated to a constant temperature is circulated, and may include temperature sensors 111 to sense the temperature of the second heat source 110.

A support member 150 to support the second heat source 110 to maintain the separation state between the second heat source 110 and the inner surface of the cover 11 may be installed between the second heat source 110 and the inner surface of the cover 11.

The support member 150 supports the second heat source 110 in the separation state from the inner surface of the cover 11, thus minimizing heat transfer to the cover 11 when the second heat source 110 is operated. Therefore, the support member 150 prevents the cover 11 from being heated close to the temperature of the second heat source 110.

A thermal insulator 130 having excellent thermal insulation performance to direct all of heat generated from the first heat source 120 to the object V to be measured may be arranged on the upper surfaces of the first heat source 120 and the second heat source 110. Such a thermal insulator 130 may be formed of a vacuum insulation panel (VIP).

The third heat source 140 may be provided on the upper surface of the thermal insulator 130. The third heat source 140 may be configured in a shape in which an electric heater is inserted into a metal or in a type in which a thin film heater is attached to a metal, in the same manner as the first heat source 120 and the second heat source 110. Further, the third heat source 140 may be configured such that a fluid heated to a constant temperature is circulated, and may include a temperature sensor 141 to sense the temperature of the third heat source 140.

The protective heat source 110, i.e., the second heat source 110, the first heat source 120, and the third heat source 140 may be heated by power supplied from a controller 20 through an electric wire 13, and the temperatures of the respective heat sources 110, 120, and 140 measured through the temperature sensors 111, 121, and 141 installed on the respective heat sources 110, 120, and 140 are input to the controller 20 through the electric wire 130.

The controller 20 controls power supply to the first heat source 120 and the rear heat source 140, i.e., the third heat source 140, while monitoring the temperatures of the first heat source 120 and the third heat source 140 measured through the temperature sensors 121 and 141 installed on the first heat source 120 and the third heat source 140, thereby controlling the first heat source 120 and the third heat source 140 to reach the same temperature. When the first heat source 120 and the third heat source 140 are set to the same temperature, a temperature difference between the first heat source 120 and the third heat source 140 becomes 0 and thus flow of heat is not generated, and simultaneously, heat flux in the direction opposite to the object V to be measured based on the first heat source 120 becomes 0 by the thermal insulator 130 located between the first heat source 120 and the third heat source 140 and thus accuracy in measurement is increased.

In the same manner, the controller 20 controls power supply to the first heat source 120 and the second heat source 110 according to the temperatures of the first heat source 120 and the second heat source 110 measured through the temperature sensors 121 and 111 installed on the first heat source 120 and the second heat source 120, thereby controlling the first heat source 120 and the second heat source 110 to reach the same temperature. Consequently, the controller 20 may control operation of the first heat source 120, the third heat source 140, and the second heat source 110 such that the temperatures of the rear heat source 140 and the second heat source 110 are the same as the temperature of the first heat source 120.

If the first heat source 120 and the second heat source 110 are set to the same temperature, as described above, there is not a temperature difference between the second heat source 110 and the heat flux sensor 100 heated to the same temperature as the first heat source 120 by the first heat source 120, and thus heat flux between the heat flux sensor 100 and the second heat source 110 on the surface of the object V to be measured may substantially become 0 when the thermal insulation performance measurement apparatus 10 contacts the object V to be measured. Further, the above three heat sources 110, 120, and 140 may maintain the same temperature at any time through proportional integral derivative (PID) temperature control, and thus continuous measurement may be executed.

The second heat source 110 may be arranged around the first heat source 120, and be separated from the heat flux sensor 100 and the first heat source 120 by a designated interval.

The thermal insulator 130 arranged between the first heat source 120 and the third heat source 140 blocks heat flow due to low heat transfer coefficient thereof even if a fine temperature difference between the first heat source 120 and the third heat source 140 is instantaneously generated, and may thus serve as a buffer to prevent generation of heat flux between the first heat source 120 and the third heat source 140.

Therefore, because heat fluxes in all directions except for a direction toward the object V to be measured based on the heat flux sensor 100 may substantially become 0, all heat fluxes measured by the heat flux sensor 100 contacting the object V to be measured in a state in which the temperatures of the heat flux sensor 100, the first heat source 120, the second heat source 110, and the third heat source 140 become equal may be reliably regarded as heat fluxes generated between the heat flux sensor 100 and the object V to be measured.

Hereinafter, a method of measuring thermal insulation performance of the object V to be measured using the thermal insulation performance measurement apparatus 10 in accordance with an embodiment of the present disclosure will be described in detail.

First, in order to measure thermal insulation performance, the heat flux sensor 100 is preheated to a designated temperature by the first heat source 120, and the second heat source 110 and the third heat source 140 are heated to the same temperature as the temperature of the heat flux sensor 100 and the first heat source 120. Here, the heating temperature may be from approximately 70° C. to approximately 90° C.

When the temperatures of the heat flux sensor 100, the first heat source 120, the second heat source 110, and the third heat source 140 become equal, measurement may be started.

Figure 3:
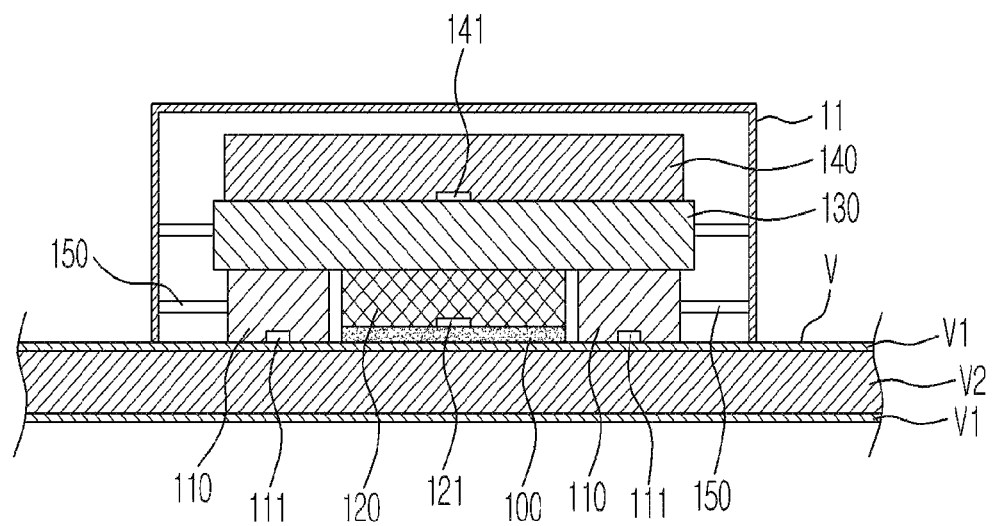
FIG. 3 is a cross-sectional view illustrating the inner structure of the thermal insulation performance measurement apparatus.
Figure 4:
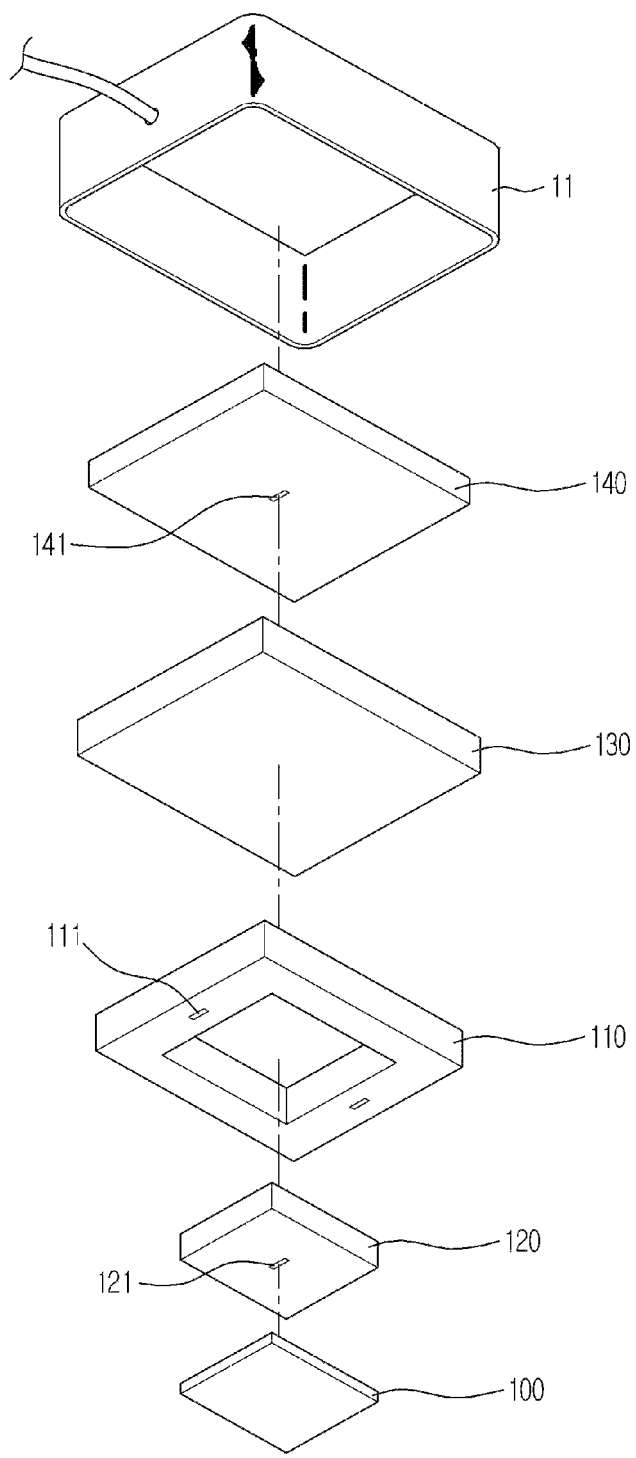
FIG. 4 is an exploded perspective view illustrating the inner structure of the thermal insulation performance measurement apparatus.

In order to execute measurement, the heat flux sensor 100 and the second heat source 110 arranged on the lower surface of the cover 11 are brought into contact with the surface of the object V to be measured. Here, the object V to be measured may be a vacuum insulation panel. The vacuum insulation panel, as shown in FIG. 3, may include a porous core member V2, and a protective film V1 surrounding the outer surface of the core member V2 and maintaining the vacuum state of the core member V2.

Figure 5:
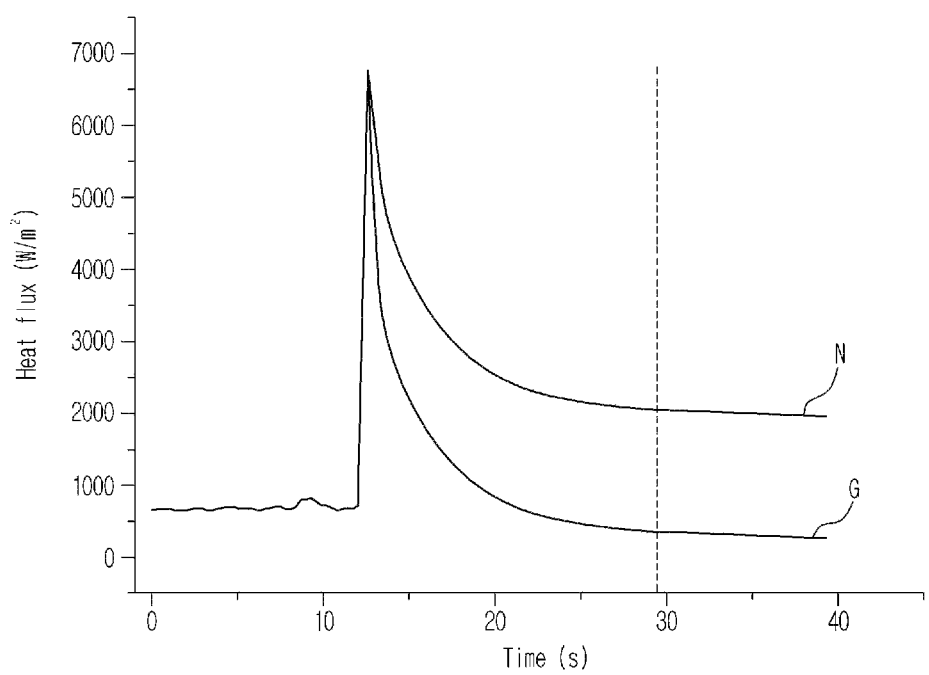
FIG. 5 is a graph illustrating variation in heat flux measured through the thermal insulation performance measurement apparatus.

As shown in FIG. 5, before the heat flux sensor 100 contacts the object V to be measured, i.e., the vacuum insulation panel, the heat flux value measured by the heat flux sensor 100 is low, and when the heat flux sensor 100 and the second heat source 110 are brought into contact with the surface of the object V to be measured, i.e., the vacuum insulation panel, the heat flux value measured by the heat flux sensor 100 is rapidly raised. The reason for this is that the thermal conductivity of the protective film V1 of the vacuum insulation panel forming the surface of the vacuum insulation panel is higher than the thermal conductivity of the inner core member V2, and thus high heat flux is generated toward the protective film V1 having a relatively high thermal conductivity in the early stage in which the heat sensor 100 contacts the surface of the vacuum insulation panel, due to a kind of surface effect.

However, as time goes by after contact of the heat flux sensor 100 with the surface of the vacuum insulation panel V, the heat flux value measured by the heat flux sensor 100 is gradually lowered. The reason for this is that the heat flux value is rapidly raised by metal foil laminated in the protective film V1 in the early state of contact, but as time goes by, the protective film V1 is heated to a temperature similar to the temperature of the heat flux sensor 100, the surface effect disappears, and low thermal conductivity characteristics of the core member V2 are reflected.

Therefore, the heat flux value measured by the heat flux sensor 100 after a designated measurement standby time from contact of the heat flux sensor 100 with the vacuum insulation panel V has elapsed may be considered as an index of measurement of thermal insulation performance.

It is understood that, if the vacuum insulation panel is in a normal state, the heat flux values measured by the heat flux sensor 10 are formed in a pattern as the curve G and are converged on a relatively low value, but if the vacuum insulation panel is in an abnormal state, the heat flux values measured by the heat flux sensor 100 are converged on a value as in the curve N, which is higher than the value on the curve G.

In case of the vacuum insulation panel V, the above measurement standby time may be varied according to the material or thickness of the protective film V1, and thus determined in consideration of securing of reliability of measured values through repeated experimentation and necessity of rapidly measuring thermal insulation performance. In case of a general vacuum insulation panel, the measurement standby time may be from approximately 7 seconds to approximately 15 seconds.

The heat flux value is finally measured by the heat flux sensor 100 through the above-described process, but the heat flux value does not directly mean thermal conductivity.

Figure 6:
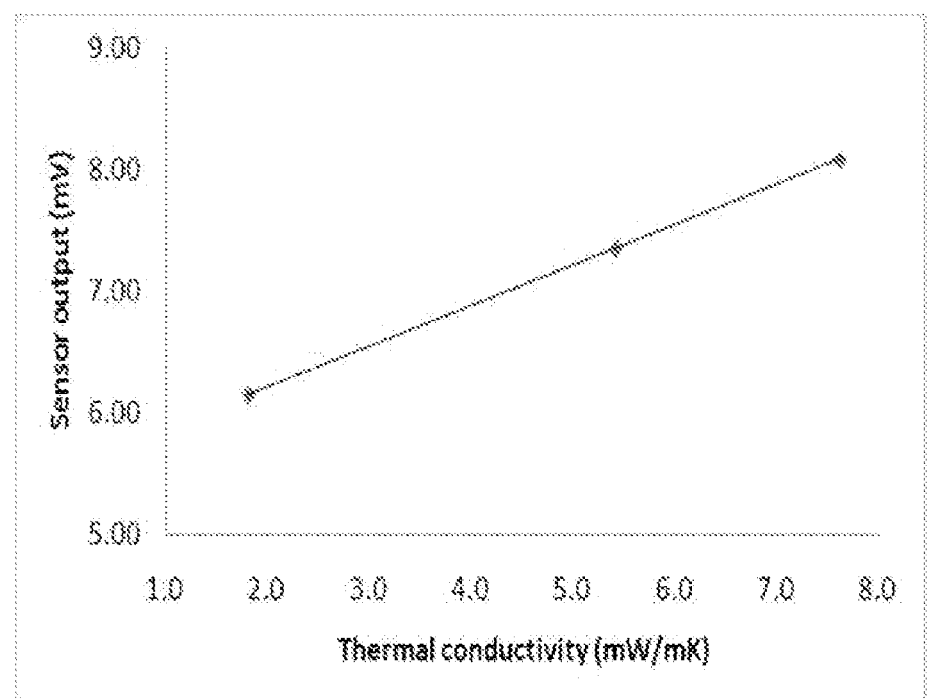
FIG. 6 is a graph illustrating a relationship between thermal conductivity and heat flux.

However, because thermal conductivity and heat flux of a certain object are linearly proportional to each other, a graph illustrating a relationship between thermal conductivity and heat flux, as shown in FIG. 6, may be acquired by measuring heat fluxes of a plurality of different thermal insulators, thermal conductivities of which are measured in advance through a separate thermal conductivity measurement apparatus (not shown), through the thermal insulation performance measurement apparatus 10 in accordance with the embodiment of the present disclosure and then establishing a database in which a relationship between the measured thermal conductivities and the heat fluxes measured through the thermal insulation performance measurement apparatus 10 are stored.

That is, the heat flux measured through the thermal insulation performance measurement apparatus 10 is output in the shape of a potential difference through the heat flux sensor 100. However, thermal conductivity of the vacuum insulation panel V may be estimated using the data prepared in advance, as shown in FIG. 6, and consequently, whether or not the vacuum insulation panel is normally operated may be checked by judging whether or not the vacuum insulation panel V has thermal conductivity within a normal range through the heat flux measured through the thermal insulation performance measurement apparatus 10.

Further, the data regarding a relationship between thermal conductivity and heat flux may be periodically corrected by periodically measuring heat fluxes of plural different thermal insulators, thermal conductivities of which are measured in advance through a separate thermal conductivity measurement apparatus (not shown), through the thermal insulation performance measurement apparatus 10 in accordance with the embodiment of the present disclosure in the above-described method.

Figure 7:
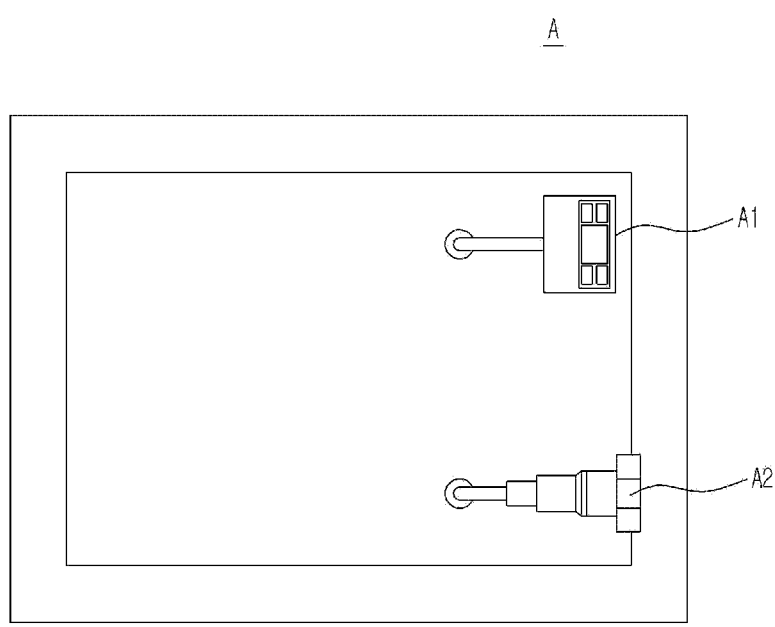
FIG. 7 is a view illustrating a vacuum insulation panel, the inner pressure of which is adjustable.

Further, data regarding a relationship between thermal conductivity and heat flux may be acquired using a vacuum insulation panel A, the inner pressure of which is measurable and adjustable, as shown in FIG. 7, and the data regarding these relationships may be periodically corrected.

In the vacuum insulation panel A, the inner pressure of which is measurable and adjustable, as shown in FIG. 7, includes a pressure gauge A1 measuring the inner pressure of the vacuum insulation panel A, and an adjustment valve A2 to adjust the inner pressure of the vacuum insulation panel A. Therefore, a user may adjust the inner pressure (a degree of vacuum of the inside) of the vacuum insulation panel A through the adjustment valve A2 while monitoring the inner pressure of the vacuum insulation panel A through the pressure gauge A1.

Data regarding a relationship between thermal conductivities the vacuum insulation panel A measured through a separate fine thermal conductivity measurement apparatus (not shown) under the condition that the inner pressure (the degree of vacuum of the inside) of the vacuum insulation panel A is adjusted, and heat fluxes of the vacuum insulation panel A measured by the heat flux sensor 100 (with reference to FIG. 3), and thermal conductivity of the object to be measured may be estimated from the measured heat flux of the object V to be measured based on the data.

Figure 8:
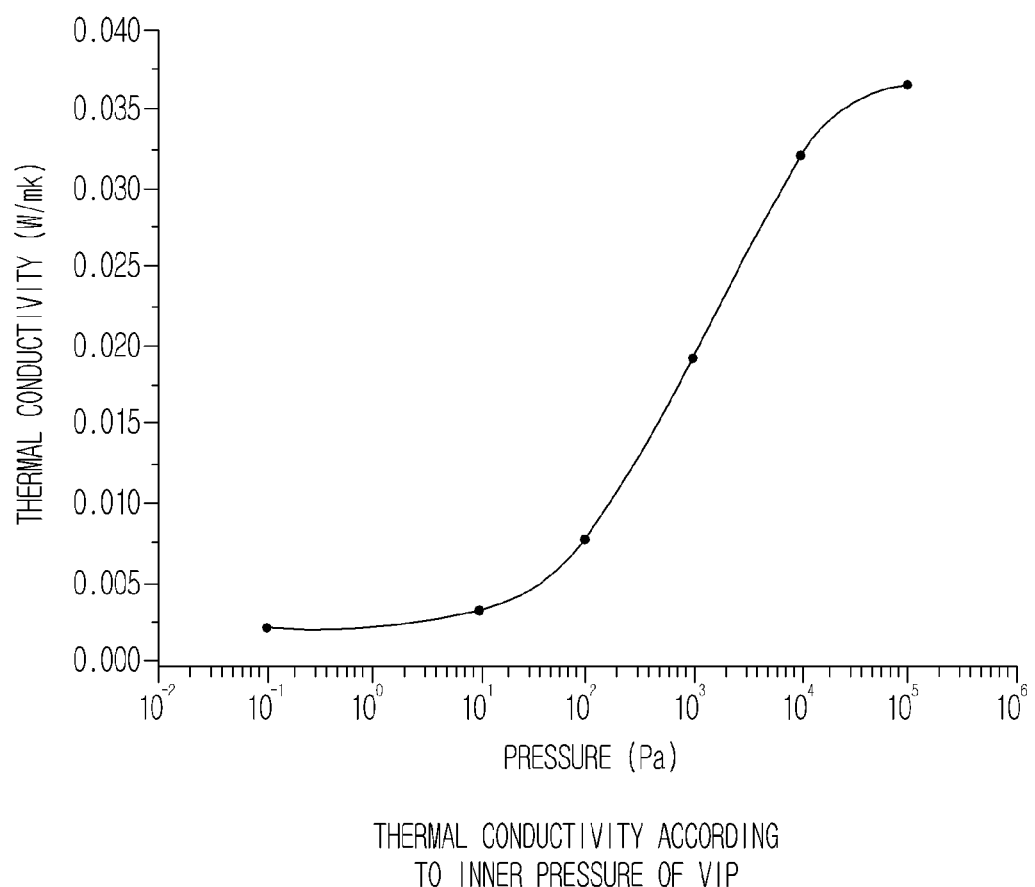
FIG. 8 is a graph illustrating a relationship between the inner pressure and thermal conductivity of a vacuum insulation panel.

Further, the inner pressure of the vacuum insulation panel and the thermal conductivity of the vacuum insulation panel are inversely proportional to each other, as shown in the graph of FIG. 8. Therefore, if the inner pressure (the degree of vacuum of the inside) of the vacuum insulation panel is given, the thermal conductivity of the vacuum insulation panel may be estimated using the graph of FIG. 8. Through such a method, the data regarding the relationship between thermal conductivity and heat flux may be corrected by calculating thermal conductivities of the vacuum insulation panel estimated according to respective inner pressures using the graph of FIG. 8 while adjusting the inner pressure of the vacuum insulation panel to several degrees, and by measuring the heat fluxes through the thermal insulation performance measurement apparatus 10 in accordance with the embodiment of the present disclosure.

The above graph of FIG. 8 is established through experimentation, and a detailed description thereof will thus be omitted.

Figure 9:
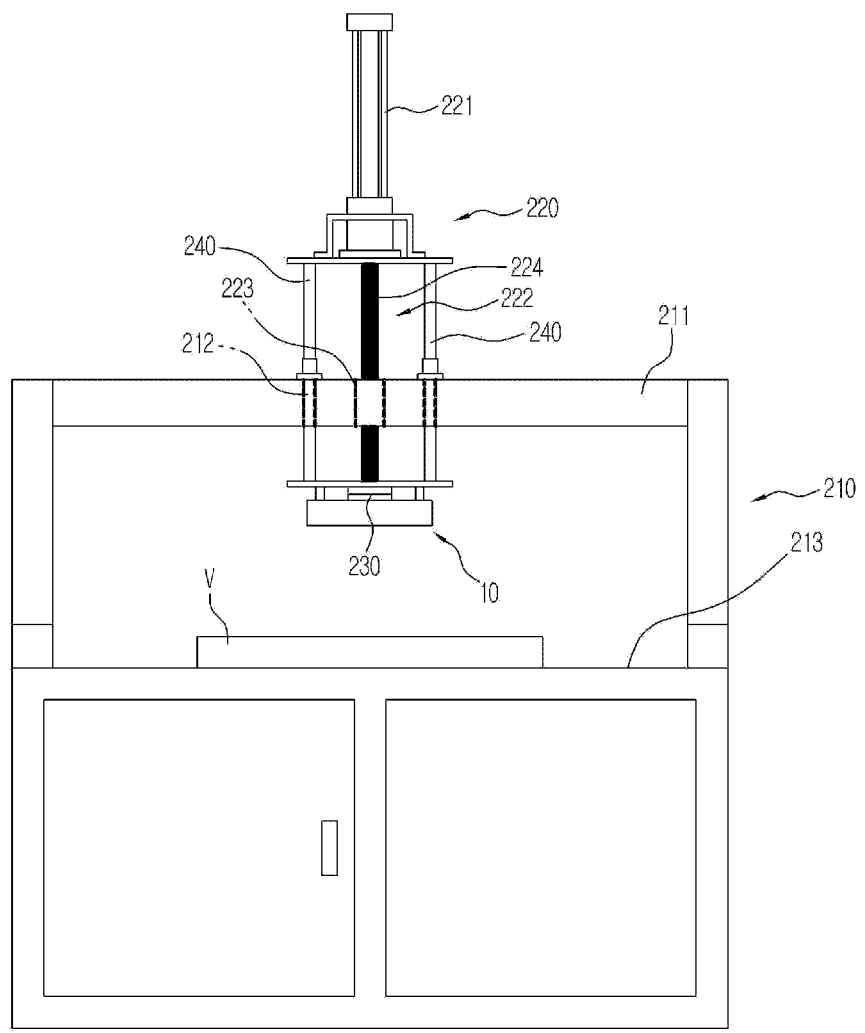
FIG. 9 is a view illustrating an automatic measurement system in accordance with an embodiment of the present disclosure.

The thermal insulation performance measurement apparatus 10 in accordance with the embodiment of the present disclosure, as shown in FIG. 1, may constitute an automatic measurement system 200, as shown in FIG. 9. The automatic measurement system 200 may include a main frame 210, a drive device 220 vertically moving the thermal insulation performance measurement apparatus 10 to cause contact of the thermal insulation performance measurement apparatus 10 with an object V to be measured at a constant pressure, a rod cell 230 to measure pressure applied between the thermal insulation performance measurement apparatus 10 and the object V to be measured, and guide rods 240 guiding vertical movement of the drive device 220 and the rod cell 230 against the main frame 210.

The drive device 220 may include a servomotor 221 to provide driving force, and a ball screw 222 to convert a rotational motion generated from the servomotor 221 into a linear motion.

The rod cell 230 and the thermal insulation performance measurement apparatus 10 are installed under the drive device 220. Plural guide rods 240 may be provided, and be combined with guide holes 212 provided on the main frame 210 so that the drive device 220 may vertically move against the main frame 210.

A nut part 223 of the ball screw 222 is installed on an upper plate 211 of the main frame 210. Therefore, when a screw part 224 of the ball screw 222 is rotated by the servomotor 221, the screw part 224 vertically moves, and then the drive device 220, the thermal insulation performance measurement apparatus 10 and the rod cell 230 vertically move.

Now, an operating process of the automatic measurement system 200 will be described. First, the object V to be measured is placed on a table 213 on the main frame 210 below the thermal insulation performance measurement apparatus 10, and then the servomotor 221 is operated to induce downward movement of the thermal insulation performance measurement apparatus 10. As the thermal insulation performance measurement apparatus 10 starts to contact the object V to be measured, the rod cell 230 senses pressure applied to the object V to be measured by the thermal insulation performance measurement apparatus 10, the servomotor 221 is operated before such pressure reaches a proper value, operation of the servomotor 221 is stopped when the pressure reaches the proper value, and then a measuring process through the thermal insulation performance measurement apparatus 10 is started.

Thereafter, when the measuring process through thermal insulation performance measurement apparatus 10 has been completed, the servomotor 221 is operated in the direction opposite to the rotation direction of the servomotor 221 when the thermal insulation performance measurement apparatus 10 moves downwards, and then the thermal insulation performance measurement apparatus 10 moves upwards and is restored to its initial state.

Although the automatic measurement system 200 shown in FIG. 9 illustrates the drive device 220 as including the servomotor 221 and the ball screw 222, the drive device 220 is not limited thereto, and may include any drive element causing a linear reciprocating motion. For example, the drive device 220 may include an air cylinder operated by pneumatic pressure, a hydraulic cylinder operated by hydraulic pressure, or a linear motor. Further, the servomotor 221 of the drive device 220 may be replaced with a stepper motor.

Figure 10:
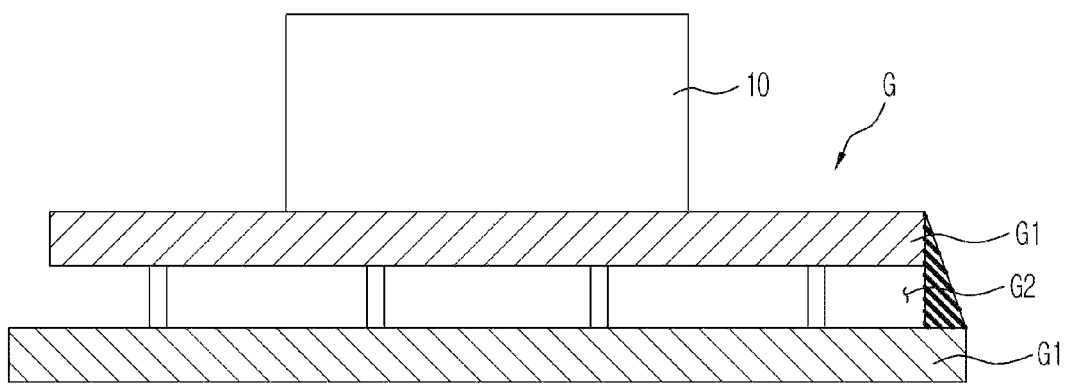
FIG. 10 is a view illustrating a state in which the thermal insulation performance measurement apparatus is used to measure thermal insulation performance of a vacuum glass panel.

As shown in FIG. 10, the thermal insulation performance measurement apparatus 10 in accordance with the embodiment of the present disclosure is not limited to the vacuum insulation panel as an object to be measured, and may be applied to a vacuum glass panel G. The automatic measurement system 200 or the thermal insulation performance measurement apparatus 10 manually operated may be used to measure thermal insulation performance of the vacuum glass panel G in which a vacuum space G2 is formed between two glass sheets G1. However, differently from the outer surface film of the vacuum insulation panel, a considerable time is taken for heat to pass through the glass sheets, and thus a time taken to measure thermal insulation performance of the vacuum glass panel G after stabilization of heat flux may be long, such as approximately 1 minute, for example.

Further, a method of measuring thermal insulation performance of a thermal insulator, such as a vacuum insulation panel, through the thermal insulation performance measurement apparatus 10 in accordance with the embodiment of the present disclosure may be used as a method of measuring thermal insulation performance of a thermal insulator embedded in a refrigerator.

Figure 11:
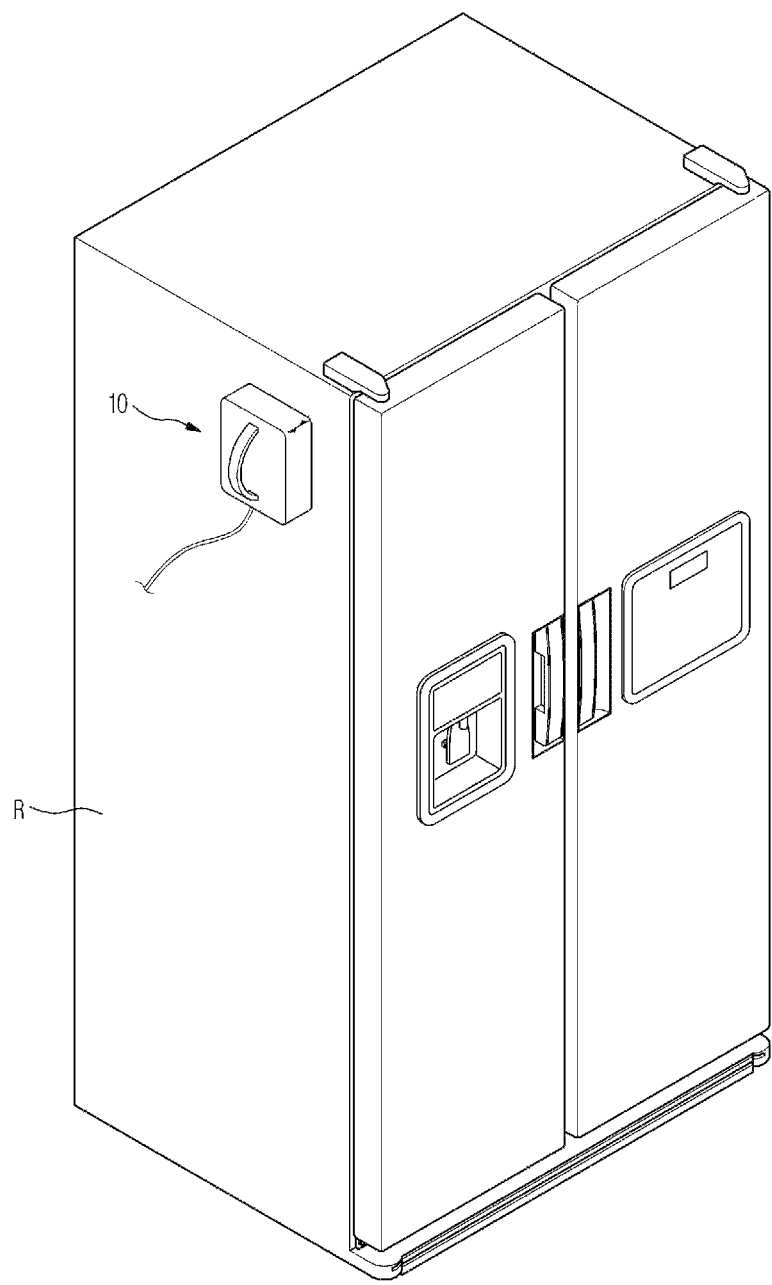
FIG. 11 is a view illustrating a state in which thermal insulation performance of a thermal insulator embedded in a refrigerator is tested using the thermal insulation performance measurement apparatus.

As shown in FIG. 11, in order to measure thermal insulation performance of a thermal insulator embedded in a refrigerator R, the thermal insulation performance measurement apparatus 10 approaches the outer wall of the refrigerator R so that the heat flux sensor 100 (with reference to FIG. 3) and the second heat source 110 (with reference to FIG. 3) contacts the outer wall of the refrigerator R, and then applies pressure to the outer wall of the refrigerator R.

Because the outer wall of the refrigerator R is formed of a metal panel or a plastic resin having higher thermal conductivity than a thermal insulator installed within the refrigerator R, the heat flux value of the outer wall of the refrigerator R measured by the heat flux sensor 100 is rapidly raised in the early state of measurement in the same manner as the vacuum insulation panel. Particularly, because the outer wall of the refrigerator R has a greater thickness than the protective film of the vacuum insulation panel, a time taken to heat the outer wall of the refrigerator R to a temperature similar to the temperature of the heat flux sensor 100 to remove the surface effect may be longer than the time taken in the vacuum insulation panel. Therefore, the measurement standby time of the thermal insulator embedded in the refrigerator R may be longer than that of the vacuum insulation panel. However, when the outer wall of the refrigerator R is heated to a similar temperature to the temperature of the heat flux sensor 100 and the surface effect disappears, the thermal insulation effect of the thermal insulator is reflected in the heat flux value, and thus the measured heat flux value is gradually decreased and converged into a designated value as time goes by. Therefore, a time taken to converge the measured value is served as the measurement standby time, and whether or not the thermal insulator embedded in the refrigerator R is normally operated may be checked using the measured value after the measurement standby time from starting of measurement has elapsed.

Figure 12:
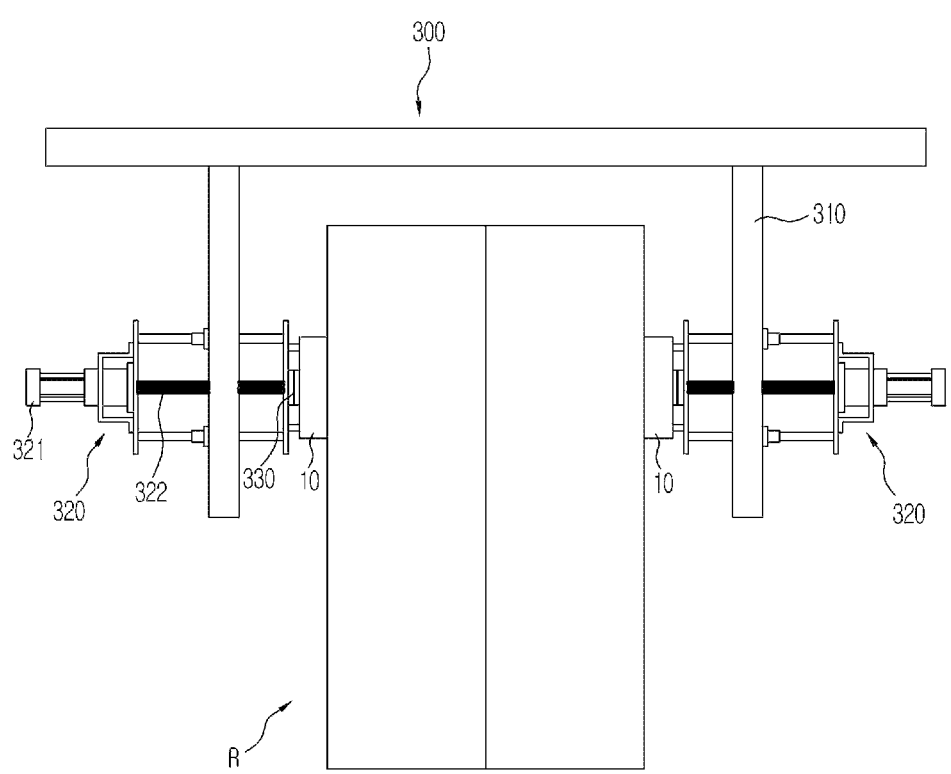
FIG. 12 is view illustrating an automatic measurement system for refrigerators in accordance with an embodiment of the present disclosure.

As shown in FIG. 12, the thermal insulation performance measurement apparatus 10 in accordance with the embodiment of the present disclosure may constitute an automatic measurement system 300 for refrigerators to measure thermal insulation performance of a thermal insulator embedded in a refrigerator R.

The automatic measurement system 300 for refrigerators may include thermal insulation performance measurement apparatuses 10 arranged at both sides of the refrigerator R, drive devices 320 horizontally moving the thermal insulation performance measurement apparatuses 10, and a frame 310 to support the drive devices 320 and the thermal insulation performance measurement apparatuses 10, and the overall configuration of the automatic measurement system 300 for refrigerators except for the frame 310 may be similar to that of the above-described automatic measurement system 200 shown in FIG. 9.

The drive device 320 may include a servomotor 321 and a ball screw 322 in the same manner as the drive device 220 of the above-described automatic measurement system 200 shown in FIG. 9.

In the same manner as the drive device 220 of the above-described automatic measurement system 200 shown in FIG. 9, the drive device 320 may include an air cylinder operated by pneumatic pressure, a hydraulic cylinder operated by hydraulic pressure, or a linear motor, for example.

Further, a rod cell 330 to measure pressure applied to an object to be measured by the thermal insulation performance measurement apparatus 10 when the thermal insulation performance measurement apparatus 10 contacts the object to be measured may be installed between the drive device 320 and the thermal insulation performance measurement apparatus 10.

The automatic measurement system 300 for refrigerators may be applied to a refrigerator manufacturing line and used as final quality test equipment to judge whether or not the thermal insulator embedded in the side surface of the refrigerator R moving along a conveyer belt (not shown) is normally operated by finally measuring thermal insulation performance of the thermal insulator.

Particularly, even if the vacuum insulation panel V (with reference to FIG. 3) is judged as in a normal state in a test before the vacuum insulation panel V is embedded in a refrigerator R, the protective film V1 (with reference to FIG. 3) of the vacuum insulation panel V may be damaged during embedment of the vacuum insulation panel V in the refrigerator R, the inner pressure of the vacuum insulation panel V may be raised, and thus a defect of the vacuum insulation panel V may be generated. Therefore, in order to prepare for the possibility of defect generation in the manufacture of the refrigerator R, whether or not the vacuum insulation panel is normally operated may be tested by measuring thermal insulation performance of the vacuum insulation panel within the refrigerator R using the automatic measurement system 300 in the final stage of product manufacture.

The above-described embodiments may be recorded in computer-readable media including program instructions to implement various operations embodied by a computer. The media may also include, alone or in combination with the program instructions, data files, data structures, and the like. The program instructions recorded on the media may be those specially designed and constructed for the purposes of embodiments, or they may be of the kind well-known and available to those having skill in the computer software arts. Examples of computer-readable media include magnetic media such as hard disks, floppy disks, and magnetic tape; optical media such as CD ROM disks and DVDs; magneto-optical media such as optical disks; and hardware devices that are specially configured to store and perform program instructions, such as read-only memory (ROM), random access memory (RAM), flash memory, and the like. The computer-readable media may also be a distributed network, so that the program instructions are stored and executed in a distributed fashion. The program instructions may be executed by one or more processors. The computer-readable media may also be embodied in at least one application specific integrated circuit (ASIC) or Field Programmable Gate Array (FPGA), which executes (processes like a processor) program instructions. Examples of program instructions include both machine code, such as produced by a compiler, and files containing higher level code that may be executed by the computer using an interpreter. The above-described devices may be configured to act as one or more software modules in order to perform the operations of the above-described embodiments, or vice versa.

Although a few embodiments of the present invention have been shown and described, it would be appreciated by those skilled in the art that changes may be made in these embodiments without departing from the principles and spirit of the invention, the scope of which is defined in the claims and their equivalents.

What is claimed is:

1. A thermal insulation performance measurement apparatus comprising:

a heat flux sensor provided with a lower portion contactable with a target measurement object;
a first heat source disposed in contact with an upper portion of the heat flux sensor to supply heat to the heat flux sensor;
a second heat source provided around the first heat source so that a temperature thereof is maintained at the same temperature as the first heat source and disposed separately from the first heat source by a predetermined distance; and
an insulator disposed on the first heat source.

2. The apparatus of claim 1, wherein the apparatus controls the first heat source and the second heat source to be maintained substantially at the same temperature.

3. The apparatus of claim 1, wherein the insulator is disposed with a size corresponding to sizes of upper surfaces of the first heat source and the second heat source.

4. The apparatus of claim 1, wherein the second heat source is disposed so that a height thereof is substantially the same as heights from the target measurement object to the heat flux sensor and the first heat source.

5. The apparatus of claim 1, further comprising a third heat source disposed on the insulator to prevent generation of heat flux above the heat flux sensor.

6. The apparatus of claim 5, further comprising a controller which controls temperatures of the first heat source, the second heat source, and the third heat source.

7. The apparatus of claim 6, wherein the controller controls the temperatures of the first heat source, the second heat source, and the third heat source to be maintained substantially at the same temperature.

8. The apparatus of claim 1, wherein the heat flux sensor is in a contact type and is a thin plate in a film form.

9. The apparatus of claim 1, wherein the insulator is a vacuum insulator.

10. The apparatus of claim 5, wherein a temperature sensor is installed in each of the first, second, and third heat sources.

11. The apparatus of claim 5, wherein a temperature of heating the first, second, and third heat sources is in a range of 70 to 90° C.

12. An automatic measurement system comprising:
a thermal insulation performance measurement apparatus including:
a heat flux sensor provided with a lower portion contactable with a target measurement object;
a first heat source disposed in contact with an upper portion of the heat flux sensor to supply heat to the heat flux sensor;
a second heat source provided around the first heat source so that a temperature thereof is maintained at the same temperature as the first heat source and disposed separately from the first heat source by a predetermined distance; and
an insulator disposed on the first heat source; and
a drive device configured to move the thermal insulation performance measurement apparatus to contact the target measurement object at a designated pressure.

13. The system of claim 12, wherein the drive device includes:
a motor configured to supply power to the drive device; and
a ball screw configured to convert a rotational motion generated from the motor into a linear motion.

14. The system of claim 12, wherein the drive device includes an air cylinder.

15. A thermal insulation performance measurement method of measuring thermal insulation performance of an insulator embedded in a refrigerator by heat flux measured by the heat flux sensor after the heat flux sensor of the thermal insulation performance measurement apparatus of claim 1 is in contact with an outer wall of the refrigerator and a designated time has elapsed.

16. A thermal insulation performance measurement method comprising:
heating a heat flux sensor up to a designated temperature using a first heat source;
heating a second heat source disposed around the heat flux sensor up to the designated temperature to prevent generation of heat flux around the heat flux sensor; and
measuring thermal insulation performance of a target measurement object by first heat flux measured from the heat flux sensor by contacting the target measurement object and the heat flux sensor heated to the designated temperature.

17. The method of claim 16, wherein upper portions of the first heat source and the second heat source are insulated by an insulator.

18. The method of claim 16, wherein a region above the heat flux sensor is heated up to the designated temperature to prevent generation of heat flux above the heat flux sensor.

19. The method of claim 16, wherein the designated temperature is in a range of 70 to 90° C.

20. The method of claim 16, wherein the thermal insulation performance of the target measurement object is measured by the first heat flux measured from the heat flux sensor after the heat flux sensor is in contact with the target measurement object and a designated time has elapsed.

21. The method of claim 16, wherein the measuring of the thermal insulation performance of the target measurement object includes:
measuring first thermal conductivities of plural samples using a thermal conductivity measurement apparatus;
measuring the second heat fluxes of the samples using the heat flux sensor and acquiring first data regarding relations between the first thermal conductivities and the second heat fluxes; and
estimating thermal conductivity of the target measurement object using the second heat flux based on the first data and measuring the thermal insulation performance of the target measurement object.

22. The method of claim 16, wherein the measuring of the thermal insulation performance of the target measurement object includes:
measuring first thermal conductivities using a thermal conductivity measurement apparatus while adjusting an inner pressure of a vacuum insulator of which the inner pressure is adjustable;
measuring second heat fluxes of the vacuum insulator using the heat flux sensor and acquiring first data regarding relations between the first thermal conductivities and the second heat fluxes; and
estimating thermal conductivity of the target measurement object using the second heat flux based on the first data and measuring the thermal insulation performance of the target measurement object.

23. The method of claim 22, further comprising:
measuring third heat fluxes of the vacuum insulator at respective degrees of the inner pressure of the vacuum insulator using the heat flux sensor while adjusting the inner pressure of the vacuum insulator of which the inner pressure is adjustable to the respective degrees; and correcting the first data by comparing the third heat fluxes with third data regarding relations between the degree of the vacuum of the inside and the thermal conductivity of the vacuum insulator.

* * * * *